Aug. 15, 1939.   Z. T. DAVIS   2,169,912
STEERING WALKING CULTIVATOR
Filed May 26, 1938   2 Sheets-Sheet 1
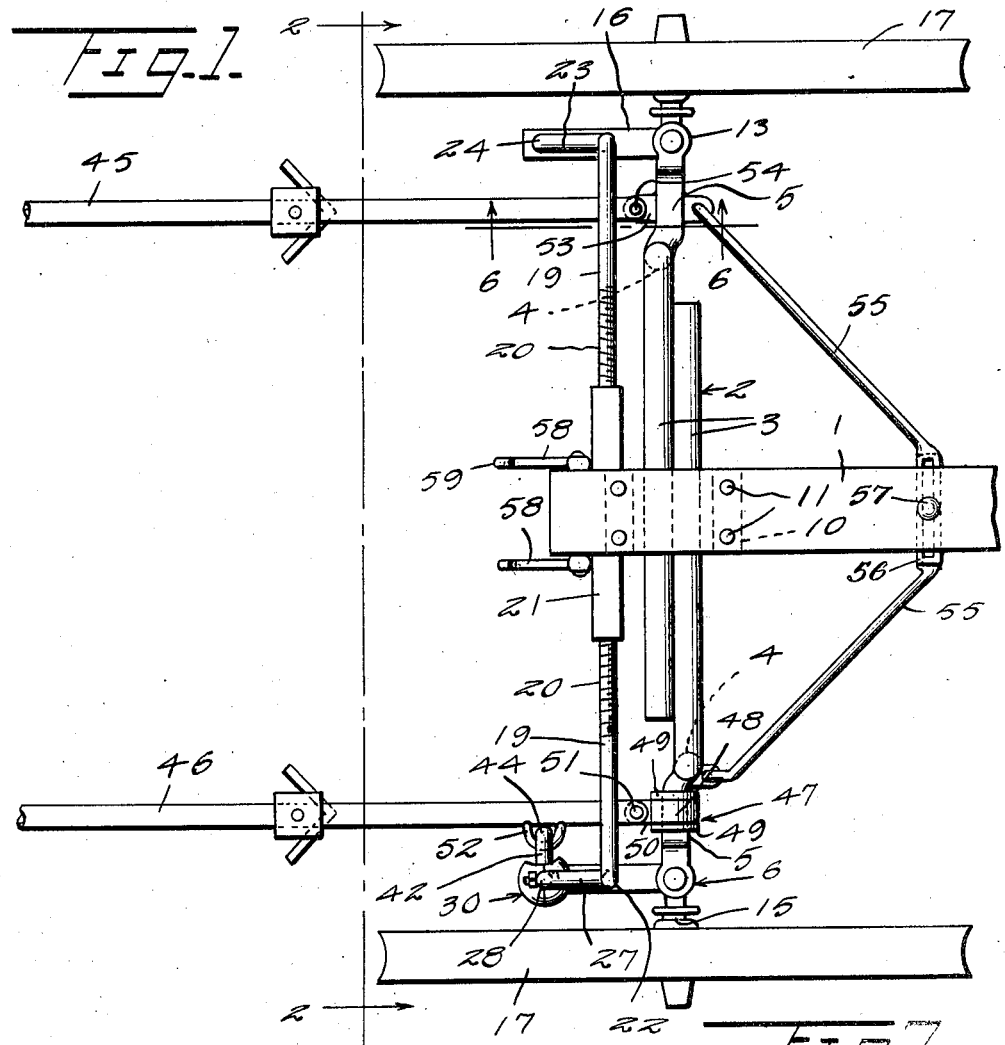
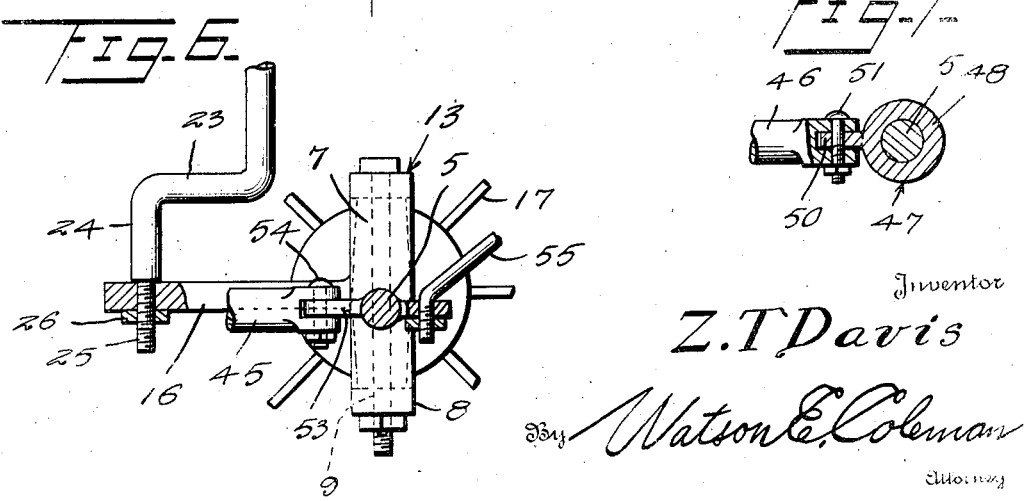
Inventor
Z. T. Davis
By Watson E. Coleman
Attorney Aug. 15, 1939.     Z. T. DAVIS     2,169,912
STEERING WALKING CULTIVATOR
Filed May 26, 1938     2 Sheets—Sheet 2
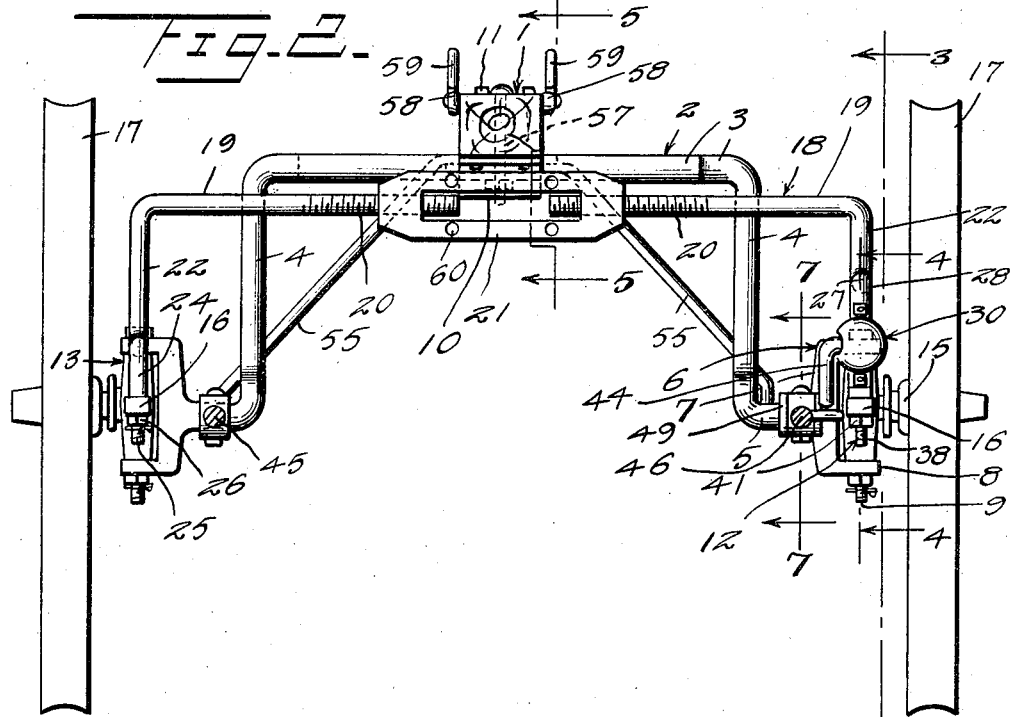
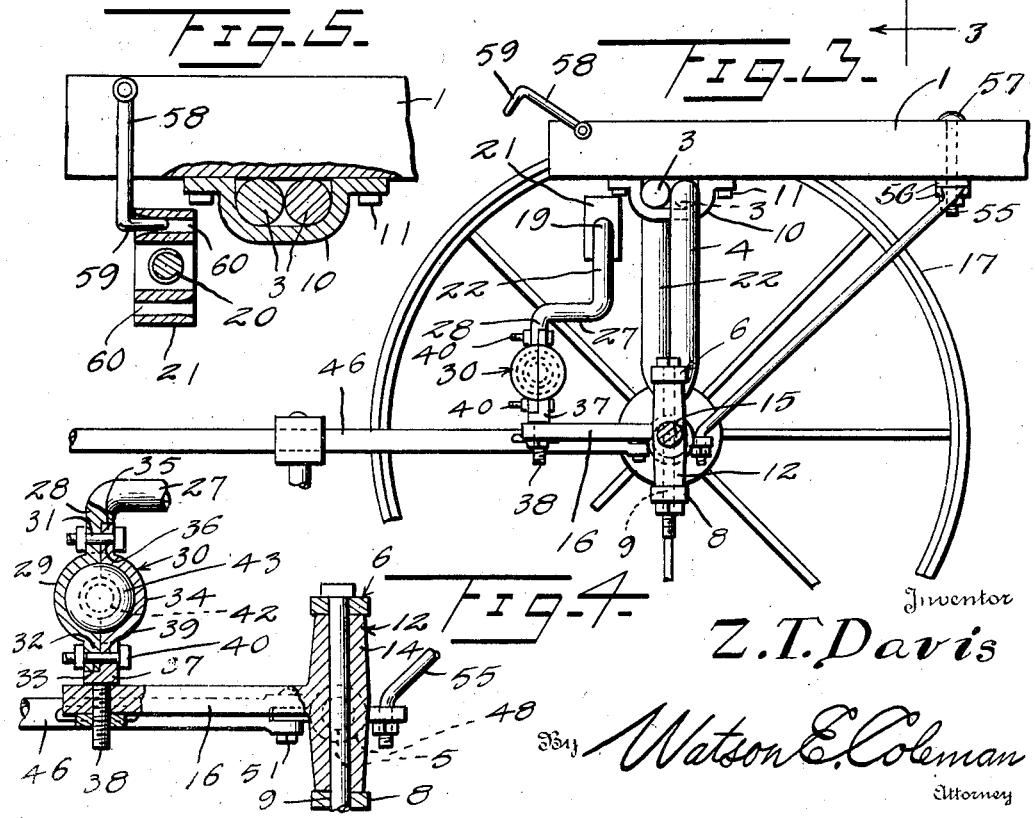
Inventor
Z. T. Davis
By Watson E. Coleman
Attorney Patented Aug. 15, 1939

2,169,912

UNITED STATES PATENT OFFICE 2,169,912

STEERING WALKING CULTIVATOR

Zack T. Davis, Beebe, Ark., assignor of one-fourth to Joyce Adkisson Herndon, Mount Vernon, Ark.

Application May 26, 1938, Serial No. 210,277

5 Claims. (Cl. 97—155)

This invention relates to the class of cultivators and pertains particularly to improvements in steering walking cultivators.

The present invention has for its primary object to provide an improved cultivator structure with the novel means of shifting the cultivator blade or plow carrying means independently of the cultivator frame whereby to more effectively operate the cultivator plows along irregular rows or around stumps or other fixed objects which may lie in the path of the machine.

Another object of the invention is to provide an improved steering walking cultivator wherein a novel means is employed for controlling the ground engaging wheels supporting the cultivator structure from the cultivator plow carrying beams whereby the entire cultivator structure may be guided by the oscillation of one of such beams.

Still another object of the invention is to provide an improved steering walking cultivator in which novel means is provided for adjusting the cultivator structure as to width so that the same may be adapted to cultivate plant rows of different fields which may be set apart at different or varying distances.

Still another object of the invention is to provide a steering walking cultivator which is so constructed that the wheels may have free swinging movement through a wide range or arc so that the machine may be turned in a very small area, thus making it possible to cultivate rows of plants to within a short distance of fences or other boundary markers.

A still further object of the invention is to provide in a steering walking cultivator, a novel means whereby normally freely oscillatable or swingable plow means may be coupled, when desired, with a steering element of the machine to facilitate the employment of one of said beams as a steering means for the machine.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:—

Figure 1 is a view in top plan of the machine embodying the present invention.

Figure 2 is a sectional view taken substantially upon the line 2—2 of Figure 1.

Figure 3 is a sectional view taken substantially upon the line 3—3 of Figure 3.

Figure 4 is a sectional view on the line 4—4 of Figure 2.

Figure 5 is a section on the line 5—5 of Figure 2, showing the latching hooks in engaged position.

Figure 6 is a section on the line 6—6 of Figure 1.

Figure 7 is a section on the line 7—7 of Figure 2.

Referring now more particularly to the drawings, the numeral 1 designates a draft beam or tongue for the machine embodying the present invention, to the underside of which is secured the structure constituting the frame of the machine and indicated as a whole by the numeral 2. This frame consists of two beams 3 each of which is integrally connected at one end with a vertical post 4, the lower end of which post joins a laterally extending arm 5 which terminates in a vertically arranged fork 6. Each of the forks 6 consists of a vertical portion 7 and the two vertically spaced outwardly extending ears 8, each of which has a vertical spindle bolt opening 9 therethrough. The two beams 3 of the frame are disposed in spaced parallel relation across the underside of the draft tongue 1 with their free ends oppositely directed so that they combine with the posts 4 to form a frame of inverted U-form, the steering forks 6 opening laterally with respect to the frame, as previously stated. These beams 3 may be secured in any suitable manner to the underside of the draft tongue as by the use of a plate, such as is indicated by the numeral 10, which may be secured tightly in position by bolts 11 to maintain the beams 3 against movement but which may be loosened so that such beams may be relatively shifted, when desired, to permit of the changing of the width of the frame structure.

In each of the forks 6 is a spindle structure, one of which is indicated by the numeral 12, while the other is indicated by the numeral 13, the spindle structure 12 here being shown as upon the right hand side of the machine. This spindle is employed in association with the steering of the machine through the medium of one of the cultivator plow carrying beams, as will be hereinafter more specifically described, and may be referred to as the steering spindle.

Each of the spindles comprises a spindle bolt sleeve 14 which is disposed vertically between the ears 8 of a fork and formed integrally with this sleeve is the wheel axle 15 and a rearwardly extending steering arm 16. The wheels mounted upon the axles 15, are indicated by the numerals 17.

Connecting the steering arms 16 is a tie rod unit, indicated as a whole by the numeral 18, and comprising the two end opposed rod sections 19 which extend transversely of the frame 2 in close proximity to the rear side thereof and which have their adjacent ends screw-threaded, as indicated at 20, and connected by a turnbuckle 21. These rod sections 19 join at their outer ends with vertical tie rod posts 22, which at their lower ends, merge into horizontal rearwardly extending arm portion. The portion at the lower end of the post adjacent the steering spindle unit 13 is designated 23, and this, terminates in the downwardly extending finger 24 which has a reduced threaded end portion 25, which passes through a vertical opening in the steering arm 16, which forms a part of the spindle structure 13. A nut 26 threaded onto the portion 25 maintains this portion of the arm extension 24 in pivotal connection with the left steering arm 12.

Upon the side of the cultivator upon which the steering spindle unit 12 is located, the tie rod post 22 has the horizontal rearwardly extending arm portion indicated by numeral 27 and this terminates in the downwardly directed portion 28, which in turn is formed integrally with the semi-spherical part 29 of the socket of a ball and socket joint. This socket is generally designated by the numeral 30 and at its upper side it is provided with a bolt opening 31 which is formed through the downward extension 28, while at its lower side it has connected therewith an ear 32 through which is formed a bolt opening 33.

The co-operating semi-spherical portion of the socket 30 is indicated by the numeral 34 and this has an ear 35 on one side which is provided with a bolt opening 36 for alinement with the opening 31 and upon its opposite side it is connected with the pin 37, the end of which is reduced and threaded, as indicated at 38, for extension through a suitable aperture in the adjacent steering arm 16. The upper part of this pin has a bolt opening 39 which alines with the opening 33 and bolts 40 are passed through the alined openings 31—36 and 33—39 to maintain the halves of the socket member 30 in assembled relation. The reduced extension 38 of the pin 37 is maintained in pivotal relation with the steering arm 16 of the spindle unit 12 by the nut 41.

The numeral 42 designates a steering arm which, at one end, carries a ball 43 which is retained within the socket 30. The other end of this arm has the downturned short extension 44 for connection with a plow beam adjacent thereto, as hereinafter described.

Each of the arm portions 5 has a plow beam connected therewith, the beam at the left of the machine being indicated by the numeral 45, while the beam at the right of the machine, adjacent the steering arm 42, is indicated by the numeral 46. These beams 45 and 46 carry the earth working elements of the cultivator and the beam 45 at its forward end is connected with the arm 5 by a coupling facilitating both vertical oscillation and horizontal oscillation of the beam. This coupling is generally designated by the numeral 47 and while it may be of any form which will permit the movement described, it is here shown as consisting of a collar 48 surrounding the arm 5 and maintained in place by movement limiting rings 49 and carrying an ear 50 with which the forward end of the beam 46 may be connected as by the beam 51. Thus, it will be seen that the plow beam is permitted vertical oscillation and oscillation in a horizontal plane as desired by the operator of the machine.

Adjacent the pivotally attached end of the plow beam 46, the beam carries a thimble 52 which is vertically disposed so that the downturned end portion 44 of the steering arm 42 may be engaged therein when desired.

The frame arm 5 at the left of the machine has the earth working implement carrying beam 45 attached thereto in a manner to permit horizontal oscillation of this beam, such means being here illustrated as being in the form of an ear 53 which may form an integral part of the arm 5 to have the forward end of the beam 45 connected therewith by the pin 54, as shown, so that the stated horizontal movement of the beam 45 may be obtained.

The lower ends or fork carrying portions of the two parts of the frame 2 are connected with the draft tongue 1 by the brace rods 55, the lower ends of the rods being firmly secured to the arms 5 and the upper ends having slotted ears 56 which position against the underside of the draft tongue to be secured thereto by the bolt 57.

Pivotally attached to the sides of the draft tongue are hooks 58 each of which extends rearwardly and is adapted to have its bill 59 engaged in an aperture 60 of the turnbuckle 21. These hooks serve as steering gear locks to prevent the wheels 17 from oscillating when it is desired to move the cultivator forwardly along a straight path.

From the foregoing description it will be readily apparent that with the cultivator structure herein described, adjustment may be readily made of the frame and the steering mechanism tie rod to fit the cultivator to work differently spaced rows of plants. When the cultivator is to be operated along a straight path, the steering gear securing hooks 58 will be engaged in the aperture 60 of the turnbuckle so that lateral movement of the tie rod will be prevented and thus the wheels will be maintained against oscillatory movement. It will be noted, however, that while the wheels are held against movement, the plow beams 45 and 46 which may be steered by the attendant of the machine walking behind the latter, are free to move transversely of the path of travel of the machine so that the attendant may cultivate the ground as closely as he wishes to the rows of plants and also he may swing the plow beams as necessary to avoid large stones or stumps which may be in the way and which would have to be struck by the plows or earth working elements if the machine were of the type ordinarily used in which the earth working element carrying beams are fixed against lateral movement.

When the attendant of the machine desires to steer the entire structure, the hooks 58 are released from the turnbuckle 21 and by raising the right plow beam so as to effect engagement of the downturned end 44 of the steering rod 42 in the thimble 52 both of the wheels 17 may be turned by then swinging the beam 46 to the right or to the left depending upon the direction which the cultivator is to go. It will be readily apparent that the swinging of this beam will transmit oscillatory movement to the spindle 12 and through the medium of the tie rod 18 will transmit corresponding swinging movement to the spindle 13 at the opposite side of the machine.

What is claimed is:

1. In a machine of the character described, a draft tongue, a frame of inverted substantially U-shape form which consists of two portions each of said portions including a horizontally disposed bar, means for securing the bars of the frame portions in adjacent parallel relation to and transversely of said tongue, the lower end of each frame portion having a laterally extending arm, a vertically arranged fork carried by each arm, a steering spindle in each fork consisting of a vertically disposed sleeve, a pivot bolt securing the sleeve in the fork, an axle carried by the sleeve and a steering arm carried by the sleeve, a ground engaging wheel supported on each axle, a tie rod unit connecting said steering arms and consisting of an upper horizontal portion disposed in parallel relation with the bars of the frame portions and in close proximity thereto, and vertically disposed downwardly extending outer side portions, said horizontal portion of the tie rod being in two sections, threaded coupling means between said sections, the lower ends of said downwardly extending portions of the tie rod being attached to said steering arms, an earth working implement carrying beam pivotally attached to each of the laterally extending arms of the frame for transverse oscillatory movement, one of said beams being adapted for vertical oscillation, and a steering coupling between the said one of the beams and the adjacent downwardly extending portion of the tie rod.

2. In a machine of the character described, a draft tongue, a frame of inverted substantially U-shape form which consists of two portions each of said portions including a horizontally disposed bar, means for securing the bars of the frame portions in adjacent parallel relation to and transversely of said tongue, the lower end of each frame portion having a laterally extending arm, a vertically arranged fork carried by each arm, a steering spindle in each fork consisting of a vertically disposed sleeve, a pivot bolt securing the sleeve in the fork, an axle carried by the sleeve and a steering arm carried by the sleeve, a ground engaging wheel supported on each axle, a tie rod unit connecting said steering arms and consisting of an upper horizontal portion disposed in parallel relation with the bars of the frame portions and in close proximity thereto, and vertically disposed downwardly extending outer side portions, said horizontal portion of the tie rod being in two sections, threaded coupling means between said sections, the lower ends of said downwardly extending portions of the tie rod being attached to said steering arms, an earth working implement carrying beam pivotally attached to each of the laterally extending arms of the frame for transverse oscillatory movement, one of said beams being adapted for vertical oscillation, means facilitating the coupling of the said one of the beams upon vertical oscillation thereof with an adjacent downwardly extending portion of the tie rod to effect a steering connection with said tie rod, and means for detachably coupling the tie rod with the draft tongue.

3. In a machine of the character described, a draft tongue, an inverted substantially U-shaped frame secured at its central portion to the tongue and having downwardly extending side portions, a pair of ground engaging wheels, means connecting the wheels to the lower ends of said downwardly extending portions for oscillation upon vertical axes, a substantially U-shaped inverted tie rod having an upper portion adjacent to the upper portion of said frame and substantially parallel therewith and having downwardly extending side portions, each of said latter side portions being pivotally connected with the pivotal connecting means between the wheels and said frame, detachable latching means for coupling the upper portions of the two U-frames against relative movement, a pair of earth working implement carrying beams each pivotally attached to the lower portion of said frame for oscillatory movement transversely of the machine, one of said beams being adapted for vertical oscillatory movement, and means for establishing a universal steering coupling between the said one of the beams and said tie rod to facilitate steering the machine by said last beam when said latching means is released.

4. A steering machine of the character described, comprising a frame, a pair of axles pivotally coupled with the frame upon opposite sides for oscillation on vertical axes, supporting wheels carrying the axles, a ground working implement carrying beam attached to the frame adjacent each axle and adapted for swinging movement on a vertical pivot, one of said beams also being supported for oscillation in a vertical plane, a steering coupling connecting said axles together whereby oscillation of one axle on its axis will produce corresponding oscillation of the other axle, means so constructed and arranged that upon vertical oscillation of the said one of the beams an operative connection may be established between the said one beam and the adjacent axle whereby the latter axle may be oscillated by lateral swinging of the beam connected therewith, and means for connecting a draft means to the machine.

5. A steering machine of the character described, comprising a frame, a pair of axles pivotally coupled with the frame upon opposite sides for oscillation on vertical axes, supporting wheels carrying the axles, a ground working implement carrying beam attached to the frame adjacent each axle and adapted for swinging movement on a vertical pivot, one of said beams also being supported for oscillation in a vertical plane, a steering coupling connecting said axles together whereby oscillation of one axle on its axis will produce corresponding oscillation of the other axle, a ball and socket unit forming a part of said steering coupling connection adjacent to the said one of the beams, a finger carried by and depending from one of the elements of said unit, a thimble carried by the said one of the beams in a position to receive said finger upon vertical movement of the beam whereby subsequent lateral movement of the beam will effect oscillation of the axles, and means for connecting a draft means to the machine.

ZACK T. DAVIS.